(12) United States Patent
Guo et al.

(10) Patent No.: US 11,329,352 B2
(45) Date of Patent: May 10, 2022

(54) SECONDARY BATTERY CELL AND WINDING FORMATION SYSTEM THEREOF (71) Applicant: Ningde Amperex Technology Limited, Fujian (CN)

(72) Inventors: Peipei Guo, Fujian (CN); Yi Zhao, Fujian (CN); Ping He, Fujian (CN); Hongxin Fang, Fujian (CN); Wenqiang Cheng, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 204 days.

(21) Appl. No.: 15/908,327

(22) Filed: Feb. 28, 2018

(65) Prior Publication Data
US 2018/0190963 A1 Jul. 5, 2018

Related U.S. Application Data (63) Continuation of application No. PCT/CN2015/088638, filed on Aug. 31, 2015.

(51) Int. Cl.
*H01M 10/00* (2006.01)
*H01M 50/54* (2021.01)
(Continued)

(52) U.S. Cl.
CPC ....... *H01M 50/54* (2021.01); *H01M 10/0409* (2013.01); *H01M 10/0431* (2013.01);
(Continued)

(58) Field of Classification Search
CPC ........ H01M 2/266; H01M 2/22; H01M 2/263; H01M 10/0409; H01M 10/0587;
(Continued)

(56) References Cited

U.S. PATENT DOCUMENTS 6,300,002 B1 * 10/2001 Webb ...................... H01M 4/04
429/94
8,232,008 B2 * 7/2012 Morishima ......... H01M 50/538
429/233
(Continued)

FOREIGN PATENT DOCUMENTS

CN 1805183 A 7/2006
CN 201336332 Y 10/2009
(Continued)

OTHER PUBLICATIONS

Ningde Amperex Technology Limited, International Search Report and Written Opinion, PCT/CN2015/088638, dated May 27, 2016, 17 pgs.
(Continued)

*Primary Examiner* — Nicholas P D'Aniello
(74) *Attorney, Agent, or Firm* — Morgan, Lewis & Bockius LLP (57) ABSTRACT

The present invention provides a secondary battery. The secondary battery comprises a first electrode tab and a first electrode plate. The first electrode plate first electrode plate comprises a first current collector, a first active layer, a first electrode tab receiving groove and a first electrode plate notch. The first active layer is disposed on a surface of the first current collector. The first electrode tab receiving groove is configured to receive the first electrode tab, and the first electrode tab is electrically connected with the first current collector through the first electrode tab receiving groove. The first electrode plate notch is disposed on an edge of the first electrode tab receiving groove.

12 Claims, 6 Drawing Sheets

(51) Int. Cl.
- *H01M 10/0587* (2010.01)
- *H01M 10/04* (2006.01)
- *H01M 50/528* (2021.01)
- *H01M 50/538* (2021.01)
- *H01M 10/0525* (2010.01)
- *H01M 10/0585* (2010.01)

(52) U.S. Cl.
CPC ... *H01M 10/0525* (2013.01); *H01M 10/0585* (2013.01); *H01M 10/0587* (2013.01); *H01M 50/528* (2021.01); *H01M 50/538* (2021.01); *H01M 2220/20* (2013.01)

(58) Field of Classification Search
CPC ......... H01M 10/0585; H01M 10/0525; H01M 10/0431; H01M 2220/20; H01M 50/54; H01M 50/528; H01M 50/538; Y02E 60/10; Y02P 70/50
See application file for complete search history.

(56) References Cited

U.S. PATENT DOCUMENTS

| | | | |
|---|---|---|---|
| 10,062,897 B2 * | 8/2018 | Stern | H01M 50/54 |
| 2004/0161662 A1 * | 8/2004 | Kim | H01M 2/263 |
| | | | 429/94 |
| 2011/0020694 A1 | 10/2011 | Khakhalev et al. | |
| 2013/0252053 A1 * | 9/2013 | Woo | H01M 2/26 |
| | | | 429/94 |
| 2013/0302674 A1 * | 11/2013 | Stern | H01M 10/0585 |
| | | | 429/211 |
| 2015/0207111 A1 * | 7/2015 | Tao | H01M 4/139 |
| | | | 429/162 |
| 2016/0013455 A1 * | 1/2016 | Shiu | H01M 2/266 |
| | | | 361/679.26 |
| 2017/0092925 A1 * | 3/2017 | Shiu | H01M 10/0431 |

FOREIGN PATENT DOCUMENTS

| | | |
|---|---|---|
| CN | 101783402 A | 7/2010 |
| CN | 102315477 A | 1/2012 |
| CN | 202373667 U | 8/2012 |
| CN | 202423456 U | 9/2012 |
| CN | 202495523 U | 10/2012 |
| CN | 202839841 U | 3/2013 |
| CN | 103579666 A | 2/2014 |
| CN | 203574050 U | 4/2014 |
| CN | 203733894 U | 7/2014 |
| CN | 204538109 U | 8/2015 |
| CN | 204905336 U | 12/2015 |
| CN | 204946995 U | 1/2016 |
| CN | 105406028 A | 3/2016 |
| CN | 205355186 U | 6/2016 |
| CN | 105990612 A | 10/2016 |
| JP | 2000323135 A | 11/2000 |
| WO | WO-2012072222 A1 * | 6/2012 .......... H01M 4/0402 |

OTHER PUBLICATIONS

Chinese Office Action, CN201580082766.1, dated May 27, 2020, 7 pgs.
Chinese Office Action, CN201580082766.1, dated Jan. 8, 2021, 7 pgs.

* cited by examiner

SECONDARY BATTERY CELL AND WINDING FORMATION SYSTEM THEREOF

FIELD OF THE INVENTION

The present invention relates to the field of secondary batteries, in particular to a structure of the secondary battery.

BACKGROUND OF THE INVENTION

The lithium ion battery (one kind of secondary batteries) is widely used in the fields of electronic products, automobiles, electric vehicles, aerospace, micro-electromechanical systems, energy storage and the like. As the application environment and conditions tend to be more complex and rigorous, high requirements are proposed to the usage safety performance, energy density and manufacturing cost of the lithium-ion battery.

In the prior art, the purpose of improving energy density is achieved by configuring a groove on an electrode plate and welding an electrode tab in the groove. However, the process is realized by independent laser cleaning device and welding-winding device respectively at the present stage. The comprehensive cost of the devices is high, and the factory buildings occupy large space, with the result the manufacturing cost of the entire lithium battery is high. Furthermore, the laser cleaned groove on the electrode plate has an overheated perforation or a burned hole on the edge due to focal length fluctuation and deviation, such that a plenty of burrs are formed on a current collector on the edge of the groove; if the electrode plate with burrs is directly manufactured into a cell without processing, then the burrs will pierce the separator to cause internal short circuit, a fire disaster and other severe potential safety hazards. In the prior art, a thick adhesive tape is stuck in the groove to prevent the burrs from piercing the separator. However, sticking an adhesive tape in the groove will certainly increase the thickness of the cell, thus causing loss to energy density.

SUMMARY OF THE INVENTION

To solve the problems in the prior art, the object of the present invention is to provide a secondary battery, which can prevent the secondary battery from generating internal short circuit while improving the energy density of the secondary battery, thus improving the safety performance of the secondary battery.

Another object of the present invention is to provide a secondary battery winding formation system, which can reduce the volume of the secondary battery winding formation system, save the floor area of a factory building, reduce the manufacturing cost of the secondary battery, and improve the energy density and safety performance of the manufactured secondary battery.

To achieve the above objects, in a first aspect, the present invention provides a secondary battery, comprising an anode electrode plate, an anode electrode tab, a cathode electrode plate, a cathode electrode tab and a separator.

The anode electrode plate comprises: an anode current collector; and an anode active layer disposed on the surface of the anode current collector.

The cathode electrode plate comprises: a cathode current collector; and a cathode active layer disposed on the surface of the cathode current collector.

The separator is disposed between the anode electrode plate and the cathode electrode plate.

The anode electrode plate is formed with: an anode electrode tab receiving groove, provided with the anode current collector at the bottom and the anode active layer on the periphery, the anode electrode tab is received in the anode electrode tab receiving groove and is electrically connected to the anode current collector at the anode electrode tab receiving groove.

The cathode electrode plate is formed with: a cathode electrode tab receiving groove, provided with the cathode current collector at the bottom and the cathode active layer on the periphery, the cathode electrode tab is received in the cathode electrode tab receiving groove and is electrically connected to the cathode current collector at the cathode electrode tab receiving groove.

The anode electrode plate is further formed with: an anode electrode plate die-cut notch, located on the side edge of the anode electrode tab receiving groove and extending through the anode electrode plate.

The cathode electrode plate is further formed with: a cathode electrode plate die-cut notch, located on the side edge of the cathode electrode tab receiving groove and extending through the cathode electrode plate.

The beneficial effects of the present invention are as follows:

In the secondary battery according to the present invention, the anode electrode tab is received in the anode electrode tab receiving groove, and the cathode electrode tab is received in the cathode electrode tab receiving groove, thus effectively improving the energy density of the secondary battery; the anode electrode plate die-cut notch can remove the burrs formed on the current collector on the edge part of the anode electrode tab receiving groove during formation, and the cathode electrode plate die-cut notch can effectively remove the burrs formed on the current collector on the edge part of the cathode electrode tab receiving groove during formation, thus effectively preventing the secondary battery from generating internal short circuit, and improving the safety performance of the secondary battery while ensuring a high energy density.

DETAILED DESCRIPTION OF THE PREFERRED EMBODIMENTS

The secondary battery and winding formation system thereof of the present invention will be elaborated hereafter with reference to the drawings.

First, the secondary battery according to the first aspect of the present invention is elaborated.

With reference to FIG. 2-5, the secondary battery 1 according to the present invention comprises an anode electrode plate 101, an anode electrode tab 102, a cathode electrode plate 103, a cathode electrode tab 104 and a separator 105.

The anode electrode plate 101 comprises: an anode current collector 1011; and an anode active layer 1012 disposed on the surface of the anode current collector 1011.

The cathode electrode plate 103 comprises: a cathode current collector 1031; and a cathode active layer 1032 disposed on the surface of the cathode current collector 1031.

The separator 105 is disposed between the anode electrode plate 101 and the cathode electrode plate 103.

The anode electrode plate 101 is formed with: an anode electrode tab receiving groove 1013, provided with the anode current collector 1011 at the bottom and the anode active layer 1012 on the periphery, and receiving the anode electrode tab 102 therein, wherein, the anode electrode tab 102 is electrically connected to the anode current collector 1011 at the anode electrode tab receiving groove 1013.

The cathode electrode plate 103 is formed with: a cathode electrode tab receiving groove 1033, provided with the cathode current collector 1031 at the bottom and the cathode active layer 1032 on the periphery, and receiving the cathode electrode tab 104 therein, wherein, the cathode electrode tab 104 is electrically connected to the cathode current collector 1031 at the cathode electrode tab receiving groove 1033.

The anode electrode plate 101 is further formed with: an anode electrode plate die-cut notch 1014, located on the side edge of the anode electrode tab receiving groove 1013 and extending through the anode electrode plate 101;

The cathode electrode plate 103 is further formed with: a cathode electrode plate die-cut notch 1034, located on the side edge of the cathode electrode tab receiving groove 1033 and extending through the cathode electrode plate 103.

In the secondary battery 1 according to the present invention, the anode electrode tab 102 is received in the anode electrode tab receiving groove 1013, and the cathode electrode tab 104 is received in the cathode electrode tab receiving groove 1033, thus effectively improving the energy density of the secondary battery 1; the anode electrode plate die-cut notch 1014 can remove the burrs formed on the current collector 1011 of the edge part of the anode electrode tab receiving groove 1013 during formation, and the cathode electrode plate die-cut notch 1034 can effectively remove the burrs formed on the current collector 1031 of the edge part of the cathode electrode tab receiving groove 1033 during formation, thus effectively preventing the secondary battery 1 from generating internal short circuit, and in turn improving the safety performance of the secondary battery 1 while ensuring a high energy density.

In the secondary battery 1 according to the present invention, the secondary battery 1 is a wound-type cell.

Figure 5:
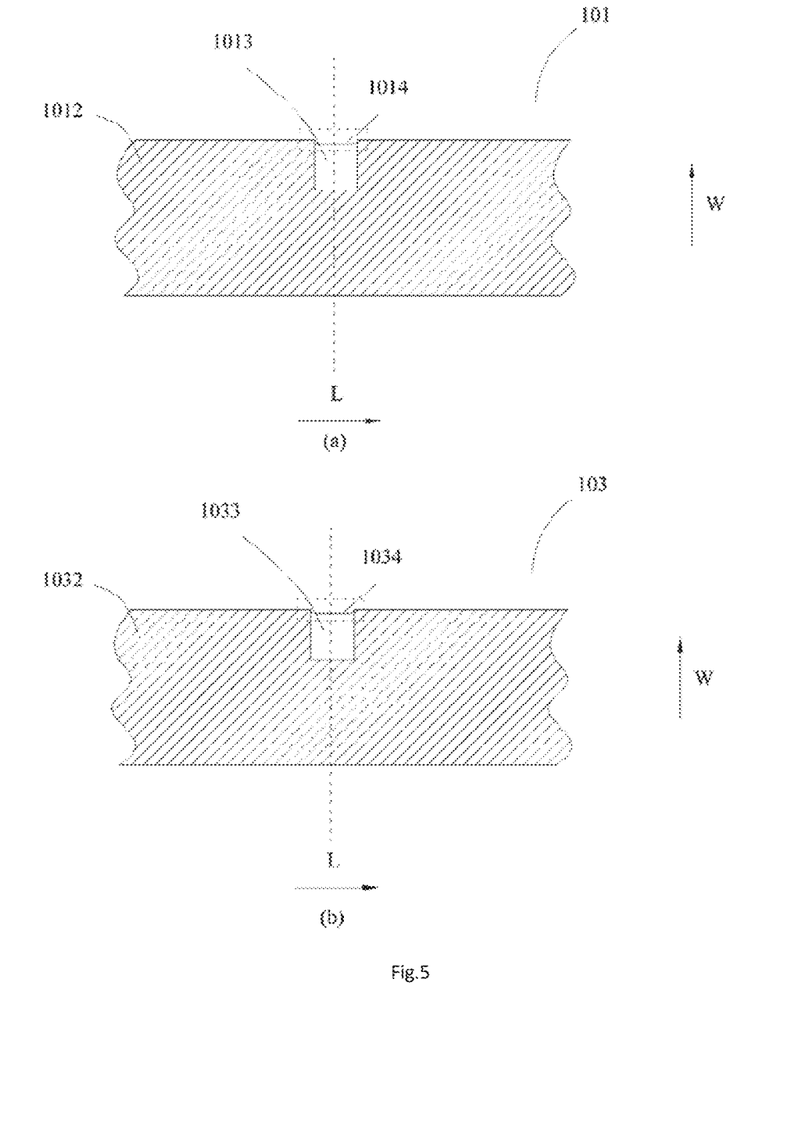
FIG. 5 is a schematic view of the electrode plates of the secondary battery of the present invention, wherein, Fig. (a) is a schematic view of the anode electrode plate, and Fig. (b) is a schematic view of the cathode electrode plate.

In the secondary battery 1 according to the present invention, with reference to FIG. 5(a), in one embodiment, the length of the anode electrode plate die-cut notch 1014 in the length direction L is 0.9-1.2 times of the length of the anode electrode tab receiving groove 1013; and the width of the anode electrode plate die-cut notch 1014 in the width direction W is 0.2-0.8 times of the width of the anode electrode tab receiving groove 1013.

In the secondary battery 1 according to the present invention, with reference to FIG. 5(b), in one embodiment, the length of the cathode electrode plate die-cut notch 1034 in the length direction L is 0.9-1.2 times of the length of the cathode electrode tab receiving groove 1033; and the width of the cathode electrode plate die-cut notch 1034 in the width direction W is 0.2-0.8 times of the width of the cathode electrode tab receiving groove 1033.

Figure 2:
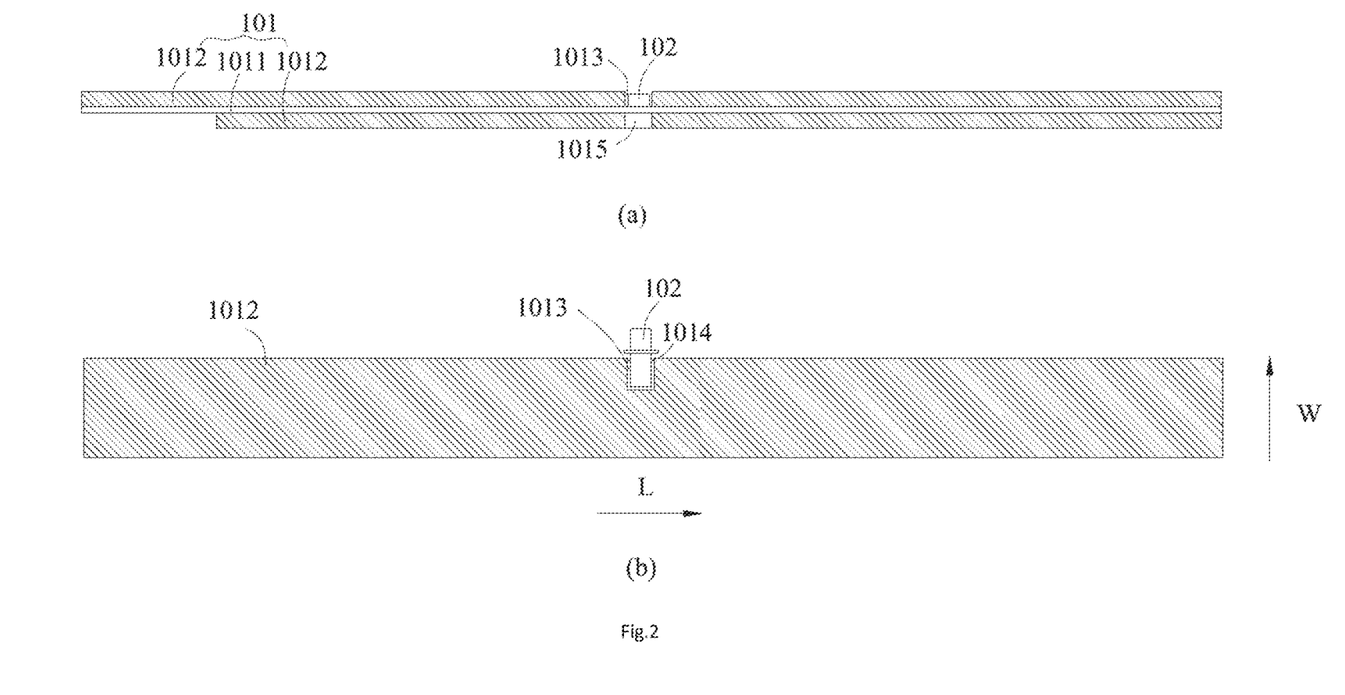
FIG. 2 is a schematic view of the welded anode electrode plate and electrode tab of the secondary battery of the present invention, wherein, Fig. (a) is a sectional view of the welded anode electrode plate and electrode tab, and Fig. (b) is a top view of the anode electrode plate as shown in Fig. (a)

In the secondary battery 1 according to the present invention, with reference to FIG. 2, in one embodiment, the anode electrode plate 101 may not stick an insulating adhesive tape T. Sticking an insulating adhesive tape T on the anode electrode plate 101 could not improve the secondary battery 1, but on the contrary may probably increase the thickness of the secondary battery 1, and reduce the energy density of the secondary battery 1.

Figure 3:
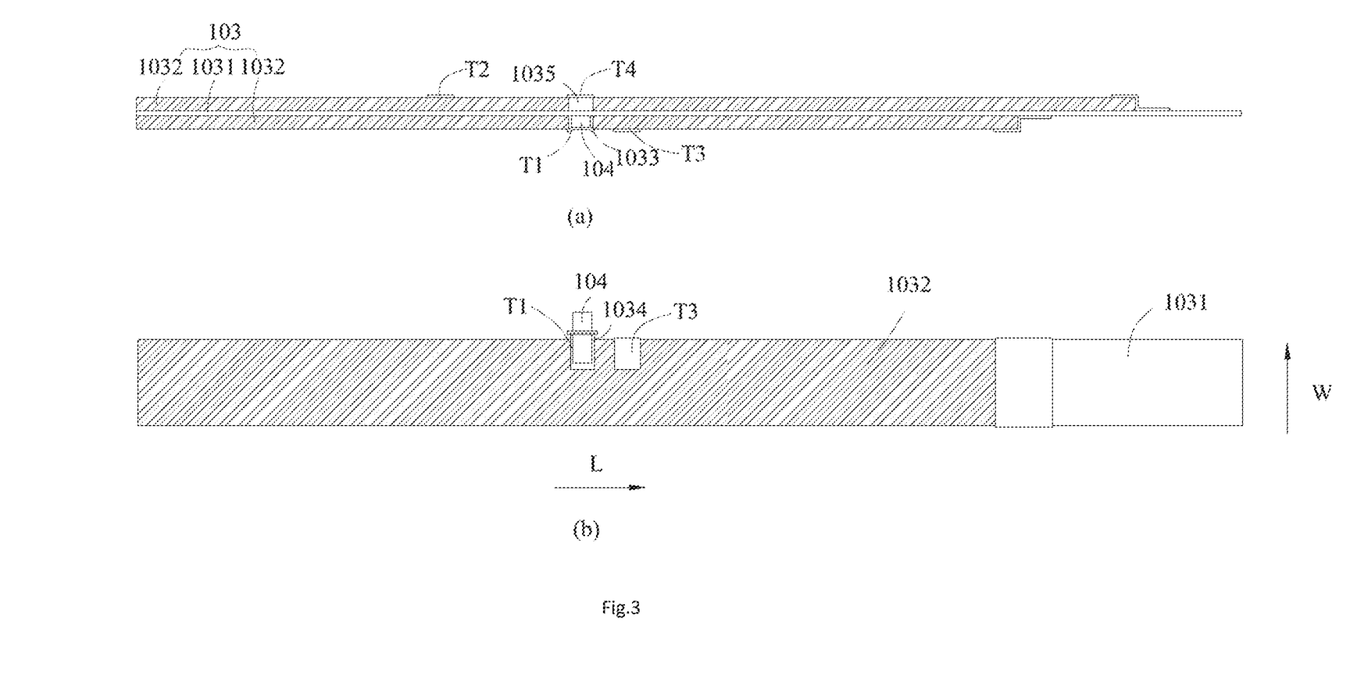
FIG. 3 is a schematic view of the welded cathode electrode plate and electrode tab of the secondary battery of the present invention, wherein, Fig. (a) is a sectional view of the welded cathode electrode plate and electrode tab, and Fig. (b) is a bottom view of the cathode electrode plate as shown in Fig. (a)
Figure 4:
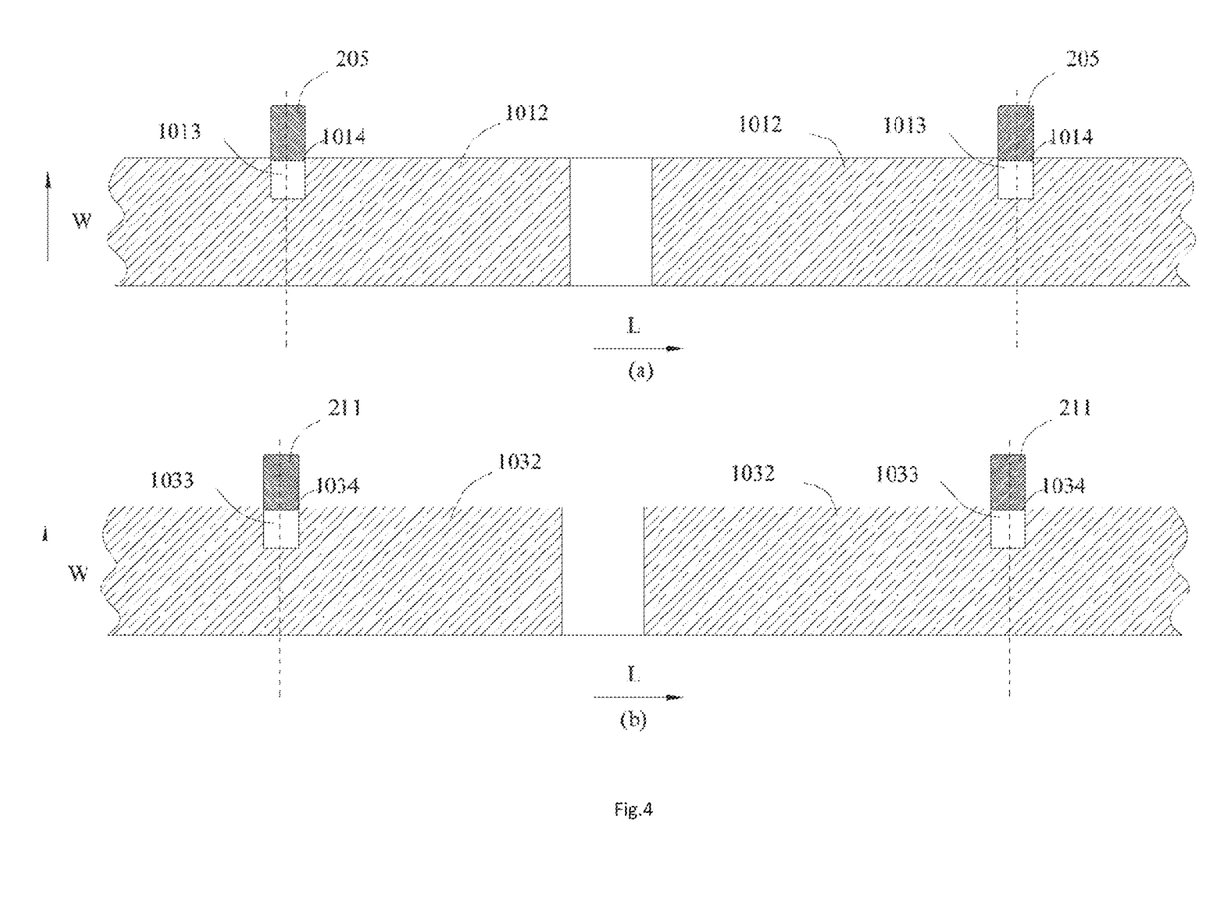
FIG. 4 is a schematic view showing the die-cutting process of the electrode plates of the secondary battery of the present invention, wherein, Fig. (a) is a schematic view showing the die-cutting process of the anode electrode plate, and Fig. (b) is a schematic view showing the die-cutting process of the cathode electrode plate.

In the secondary battery 1 according to the present invention, with reference to FIG. 3, in one embodiment, the secondary battery 1 further comprises: a first insulating adhesive tape T1, stuck at the cathode electrode tab receiving groove 1033 having received the cathode electrode tab 104; and a second insulating adhesive tape T2, stuck on the cathode active layer 1032 at a position aligned with the anode electrode tab receiving groove 1013 after the secondary battery 1 is wound and formed. Since the second insulating adhesive tape T2 is stuck, the cathode active substance of the cathode active layer 1032 dissociating to the anode electrode tab 102 is reduced; the cathode active substance of the cathode active layer 1032 dissociating and diffusing to the aligned anode electrode tab 102 is reduced; further, the cathode active substance of the cathode active layer 1032 concentrating at the anode electrode tab 102 during the charging and discharging processes of the secondary battery is alleviated; and finally, the problem that the cathode active substance is separated out at the anode electrode tab 102 is alleviated, and in the meanwhile contacting and generating internal short circuit of the anode electrode tab 102 and the cathode electrode plate 103 is avoided when the burrs at the anode electrode tab 102 pierce the separator 105.

In the secondary battery 1 according to the present invention, with reference to FIG. 2(a), in one embodiment, the anode electrode plate 101 is further formed with an anode concave 1015, provided with the anode current collector 1011 at the bottom and the anode active layer 1012 on the periphery, and located exactly on the back side of the anode electrode tab receiving groove 1013; and with reference to FIGS. 3(a) and 3(b), in the present embodiment, the secondary battery 1 further comprises: a third insulating adhesive tape T3, stuck on the cathode active layer 1032 at a position aligned with the anode concave 1015 after the secondary battery 1 is wound and formed.

In the secondary battery 1 according to the present invention, with reference to FIG. 3(a), in one embodiment, the cathode electrode plate 103 is further formed with a cathode concave 1035, provided with the cathode current collector 1031 at the bottom and the cathode active layer 1032 on the periphery, and located exactly on the back side of the cathode electrode tab receiving groove 1033; and with reference to FIGS. 3(a) and 3(b), in the present embodiment, the secondary battery 1 further comprises: a fourth insulating adhesive tape T4, stuck on the cathode concave 1035.

In the secondary battery 1 according to the present invention, in one embodiment, the anode electrode plate 101 is further formed with an anode concave 1015, provided with the anode current collector 1011 at the bottom and the anode active layer 1012 on the periphery, and located exactly on the back side of the anode electrode tab receiving groove 1013, as shown in FIG. 2(a); and the cathode electrode plate 103 is further formed with a cathode concave 1035, provided with the cathode current collector 1031 at the bottom and the cathode active layer 1032 on the periphery, and located exactly on the back side of the cathode electrode tab receiving groove 1033, as shown in FIG. 3(a). With reference to FIGS. 3(a) and 3(b), in the present embodiment, the secondary battery 1 further comprises: a third insulating adhesive tape T3, stuck on the cathode active layer 1032 at a position aligned with the anode concave 1015 after the secondary battery 1 is wound and formed; and a fourth insulating adhesive tape T4, stuck on the cathode concave 1035.

In the secondary battery 1 according to the present invention, the first insulating adhesive tape T1, the second insulating adhesive tape T2, the third insulating adhesive tape T3 and the fourth insulating adhesive tape T4 are single-sided insulating adhesive tape or double-sided insulating adhesive tape. When double-sided insulating adhesive tapes are adopted, the double-sided insulating adhesive tape sticking areas are denser than the sticking areas when single-sided insulating adhesive tapes are used, such that the integrity of the secondary battery is enhanced, thus avoiding the area from protruding and becoming the largest deformation area after a reforming process of the secondary battery and the secondary battery expands due to charging and discharging.

Second, the secondary battery winding formation system according to the second aspect of the present invention is elaborated.

Figure 1:
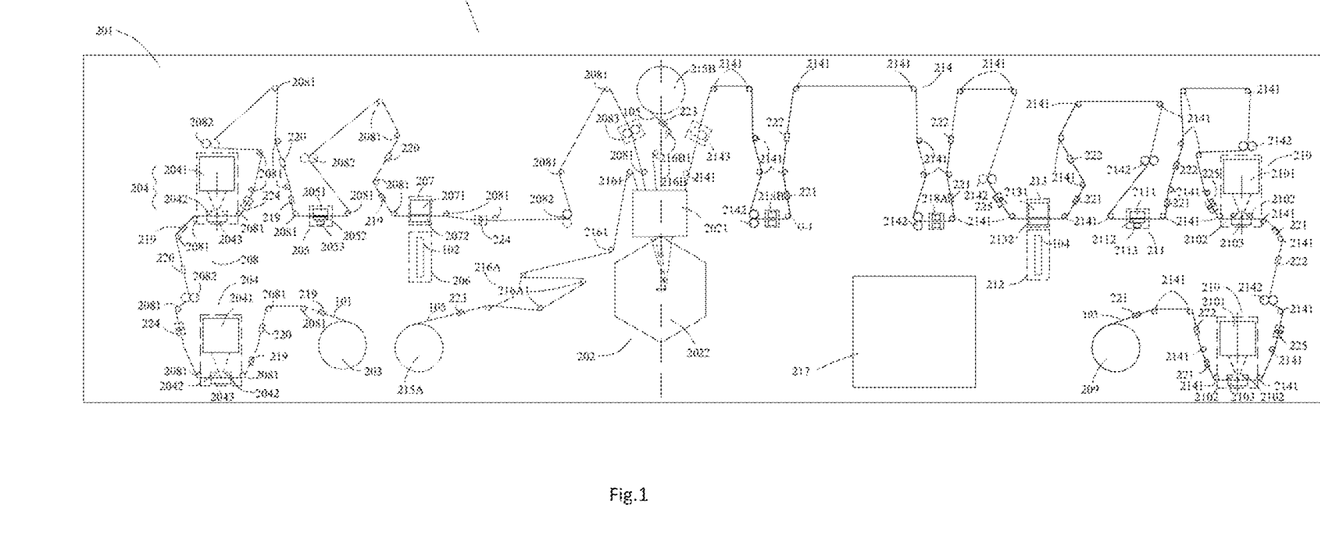
FIG. 1 is a schematic view of the secondary battery winding formation system of the present invention.

With reference to FIG. 1, the secondary battery winding formation system according to the present invention comprises a working platform 201, a winding mechanism 202, an anode electrode plate unwinding roller 203, an anode electrode plate cleaning mechanism 204, an anode electrode plate die-cutting mechanism 205, an anode electrode tab supply mechanism 206, an anode electrode tab connection mechanism 207, an anode electrode plate convey mechanism 208, a cathode electrode plate unwinding roller 209, a cathode electrode plate cleaning mechanism 210, a cathode electrode plate die-cutting mechanism 211, a cathode electrode tab supply mechanism 212, a cathode electrode tab connection mechanism 213, a cathode electrode plate convey mechanism 214, a first separator unwinding roller 215A, a second separator unwinding roller 215B, a first separator convey mechanism 216A and a second separator convey mechanism 216B.

The working platform 201 is fixed immovably.

The winding mechanism 202 is disposed on the working platform 201.

The anode electrode plate unwinding roller 203 is disposed on the working platform 201, and is wound with anode electrode plate 101, wherein, the anode electrode plate 101 comprises: an anode current collector 1011; and an anode active layer 1012 disposed on the surface of the anode current collector 1011.

The anode electrode plate cleaning mechanism 204 is disposed on the working platform 201, is located at the downstream of the anode electrode plate unwinding roller 203, and is used for cleaning out, on the anode electrode plate 101, an anode electrode tab receiving groove 1013 provided with the anode current collector 1011 at the bottom and the anode active layer 1012 on the periphery.

The anode electrode plate die-cutting mechanism 205 is disposed on the working platform 201, is located at the downstream of the anode electrode plate cleaning mechanism 204, and is used for, at the side edge of the anode electrode tab receiving groove 1013, die-cutting the anode electrode plate 101 to form an anode electrode plate die-cut notch 1014 extending through the anode electrode plate 101.

The anode electrode tab supply mechanism 206 is disposed on the working platform 201, is located at the downstream of the anode electrode plate die-cutting mechanism 205, is wound with an anode electrode tab 102, and is used for supplying the anode electrode tab 102 to the anode electrode tab receiving groove 1013 of the anode electrode plate 101 of the anode electrode plate die-cut notch 1014, such that the anode electrode tab 102 is received in the anode electrode tab receiving groove 1013.

The anode electrode tab connection mechanism 207 is disposed on the working platform 201, is located at the downstream of the anode electrode plate die-cutting mechanism 205, and is used for electrically connecting and fixing the anode electrode tab 102 received in the anode electrode tab receiving groove 1013 to the anode current collector 1011 at the anode electrode tab receiving groove 1013.

The anode electrode plate convey mechanism 208 is disposed on the working platform 201, and is used for conveying the anode electrode plate 101 unwound from the anode electrode plate unwinding roller 203 to the winding mechanism 202 sequentially via the anode electrode plate cleaning mechanism 204, the anode electrode plate die-cutting mechanism 205 and the anode electrode tab connection mechanism 207. The cathode electrode plate unwinding roller 209 is disposed on the working platform 201, and is wound with a cathode electrode plate 103, wherein, the cathode electrode plate 103 comprises: a cathode current collector 1031; and a cathode active layer 1032 disposed on the surface of the cathode current collector 1031.

The cathode electrode plate cleaning mechanism 210 is disposed on the working platform 201, is located at the downstream of the cathode electrode plate unwinding roller 209, and is used for cleaning out, on the cathode electrode plate 103, a cathode electrode tab receiving groove 1033 provided with the cathode current collector 1031 at the bottom and the cathode active layer 1032 on the periphery.

The cathode electrode plate die-cutting mechanism 211 is disposed on the working platform 201, is located at the downstream of the cathode electrode plate cleaning mechanism 210, and is used for, on the side edge of the cathode electrode tab receiving groove 1033, die-cutting the cathode electrode plate 103 to form a cathode electrode plate die-cut notch 1034 extending through the cathode electrode plate 103.

The cathode electrode tab supply mechanism 212 is disposed on the working platform 201, is located at the downstream of the cathode electrode plate die-cutting mechanism 211, is wound with a cathode electrode tab 104, and is used for supplying the cathode electrode tab 104 to the cathode electrode tab receiving groove 1033 of the cathode electrode plate 103 having die-cut out the cathode electrode plate die-cut notch 1034, such that the cathode electrode tab 104 is received in the cathode electrode tab receiving groove 1033.

The cathode electrode tab connection mechanism 213 is disposed on the working platform 201, is located at the downstream of the cathode electrode plate die-cutting mechanism 211, and is used for electrically connecting and fixing the cathode electrode tab 104 received in the cathode electrode tab receiving groove 1033 to the cathode current collector 1031 at the cathode electrode tab receiving groove 1033.

The cathode electrode plate convey mechanism 214 is disposed on the working platform 201, and is used for conveying the cathode electrode plate 103 unwound from the cathode electrode plate unwinding roller 209 to the winding mechanism 202 sequentially via the cathode electrode plate cleaning mechanism 210, the cathode electrode plate die-cutting mechanism 211 and the cathode electrode tab connection mechanism 213.

The first separator unwinding roller 215A is disposed on the working platform 201, and is wound with a separator 105.

The second separator unwinding roller 215B is disposed on the working platform 201, and is wound with another separator 105.

The first separator convey mechanism 216A is disposed on the working platform 201, and is used for conveying the corresponding separator 105 unwound from the first separator unwinding roller 215A to the winding mechanism 202, such that the corresponding separator 105 is configured between the anode electrode plate 101 and the cathode electrode plate 103 after the secondary battery is wound and formed.

The second separator convey mechanism 216B is disposed on the working platform 201, and is used for conveying the corresponding separator 105 unwound from the second separator unwinding roller 215B to the winding mechanism 202, such that the corresponding separator 105 is configured between the anode electrode plate 101 and the cathode electrode plate 103 after the secondary battery is wound and formed.

In the secondary battery winding formation system 2 according to the present invention, the winding mechanism 202, the anode electrode plate unwinding roller 203, the anode electrode plate cleaning mechanism 204, the anode electrode plate die-cutting mechanism 205, the anode electrode tab supply mechanism 206, the anode electrode tab connection mechanism 207, the anode electrode plate convey mechanism 208, the cathode electrode plate unwinding roller 209, the cathode electrode plate cleaning mechanism 210, the cathode electrode plate die-cutting mechanism 211, the cathode electrode tab supply mechanism 212, the cathode electrode tab connection mechanism 213, the cathode electrode plate convey mechanism 214, the first separator unwinding roller 215A, the second separator unwinding roller 215B, the first separator convey mechanism 216A and the second separator convey mechanism 216B are integrated on one working platform 201, thus reducing the volume of the secondary battery winding formation system 2, saving the floor area of a factory building, and reducing the manufacturing cost of the secondary battery 1; the anode electrode plate die-cutting mechanism 205 can remove burrs cleaned out by the anode electrode plate cleaning mechanism 204 and located on the current collector 1011 on the edge part of the anode electrode tab receiving groove 1013, and the cathode electrode plate die-cutting mechanism 211 can remove burrs cleaned out by the cathode electrode plate cleaning mechanism 210 and located on the current collector 1031 on the edge part of the cathode electrode tab receiving groove 1033, thus effectively preventing the manufactured secondary battery 1 from generating internal short circuit, and improving the safety performance of the manufactured secondary battery 1.

In one embodiment, the anode electrode tab receiving groove 1013 and the anode concave 1015 are respectively cleaned out on the two surfaces of the anode electrode plate 101; and the anode electrode plate convey mechanism 208 can lead and change the convey direction of the anode electrode plate 101, thus realizing a double-side cleaning effect.

In one embodiment, the cathode electrode tab receiving groove 1033 and the cathode concave 1035 are respectively cleaned out on the two surfaces of the cathode electrode plate 103; and the cathode electrode plate convey mechanism 214 can lead and change the convey direction of the cathode electrode plate 103, thus realizing a double-side cleaning effect.

In the secondary battery winding formation system 2 according to the present invention, with reference to FIG. 1, in one embodiment, the secondary battery winding formation system 2 further comprises a central control mechanism 217, in communication connection with and for controlling at least one selected from the anode electrode plate unwinding roller 203, the anode electrode plate cleaning mechanism 204, the anode electrode plate die-cutting mechanism 205, the anode electrode tab supply mechanism 206, the anode electrode tab connection mechanism 207, the cathode electrode plate unwinding roller 209, the cathode electrode plate cleaning mechanism 210, the cathode electrode plate die-cutting mechanism 211, the cathode electrode tab supply mechanism 212, the cathode electrode tab connection mechanism 213 and the winding mechanism 202.

In the secondary battery winding formation system 2 according to the present invention, with reference to FIG. 1 and FIG. 3, in one embodiment, the secondary battery winding formation system 2 further comprises: a first cathode electrode plate sticking mechanism 218A, disposed on the working platform 201, located at the downstream of the cathode electrode tab connection mechanism 213, and used for sticking a first insulating adhesive tape T1 on the cathode electrode tab receiving groove 1033 having received the cathode electrode tab 104; and a second cathode electrode plate sticking mechanism 218B, disposed on the working platform 201, located between the first cathode electrode plate sticking mechanism 218A and the winding mechanism 202, and used for sticking a second insulating adhesive tape T2 on the cathode active layer 1032 at a position aligned with the anode electrode tab receiving groove 1013 after the secondary battery 1 is wound and formed.

In the secondary battery winding formation system 2 according to the present invention, with reference to FIG. 1, in one embodiment, the anode electrode plate cleaning mechanisms 204 are two, wherein, one anode electrode plate cleaning mechanism 204 is used for cleaning out, on the anode electrode plate 101, an anode electrode tab receiving groove 1013 provided with the anode current collector 1011 at the bottom and the anode active layer 1012 on the periphery; and the other anode electrode plate cleaning mechanism 204 is used for cleaning out, on the anode electrode plate 101, an anode concave 1015 provided with the anode current collector 1011 at the bottom and the anode active layer 1012 on the periphery and located exactly on the back side of the anode electrode tab receiving groove 1013; and with reference to FIG. 1 and FIG. 3, in the present embodiment, the second cathode electrode plate sticking mechanism 218B is further used for sticking a third insulating adhesive tape T3 on the cathode active layer 1032 at a position aligned with the anode concave 1015.

In the secondary battery winding formation system 2 according to the present invention, with reference to FIG. 1, in one embodiment, the cathode electrode plate cleaning mechanisms 210 are two, wherein, one cathode electrode plate cleaning mechanism 210 is used for cleaning out, on the cathode electrode plate 103, a cathode electrode tab receiving groove 1033 provided with the cathode current collector 1031 at the bottom and the cathode active layer 1032 on the periphery; and the other cathode electrode plate cleaning mechanism 210 is used for cleaning out, on the cathode electrode plate 103, a cathode battery concave 1035 provided with the cathode current collector 1031 at the bottom and the cathode active layer 1032 on the periphery and located exactly on the back side of the cathode electrode tab receiving groove 1033; and with reference to FIG. 1 and FIG. 3, in the present embodiment, the first cathode electrode plate sticking mechanism 218A is further used for sticking a fourth insulating adhesive tape T4 on the cathode concave 1035.

In the secondary battery winding formation system 2 according to the present invention, with reference to FIG. 1, in one embodiment, the anode electrode plate cleaning mechanisms 204 are two, wherein, one anode electrode plate cleaning mechanism 204 is used for cleaning out, on the anode electrode plate 101, an anode electrode tab receiving groove 1013 provided with the anode current collector 1011 at the bottom and the anode active layer 1012 on the periphery; and the other anode electrode plate cleaning mechanism 204 is used for cleaning out, on the anode electrode plate 101, an anode concave 1015 provided with the anode current collector 1011 at the bottom and the anode active layer 1012 on the periphery and located exactly on the back side of the anode electrode tab receiving groove 1013; with reference to FIG. 1, in the present embodiment, the cathode electrode plate cleaning mechanisms 210 are two, wherein, one cathode electrode plate cleaning mechanism 210 is used for cleaning out, on the cathode electrode plate 103, a cathode electrode tab receiving groove 1033 provided with the cathode current collector 1031 at the bottom and the cathode active layer 1032 on the periphery; and the other cathode electrode plate cleaning mechanism 210 is used for cleaning out, on the cathode electrode plate 103, a cathode concave 1035 provided with the cathode current collector 1031 at the bottom and the cathode active layer 1032 on the periphery and located exactly on the back side of the cathode electrode tab receiving groove 1033; with reference to FIG. 1 and FIG. 3, in the present embodiment, the first cathode electrode plate sticking mechanism 218A is further used for sticking a fourth insulating adhesive tape T4 on the cathode concave 1035; and the second cathode electrode plate sticking mechanism 218B is further used for sticking a third insulating adhesive tape T3 on the cathode active layer 1032 at a position aligned with the anode concave 1015.

In the secondary battery winding formation system 2 according to the present invention, with reference to FIG. 1, in one embodiment, the second battery winding formation system 2 further comprises: a plurality of anode electrode plate sensing mechanisms 219, disposed on the working platform 201, in communication connection with the central control mechanism 217, located on a convey path of the anode electrode plate 101 starting from the anode electrode plate unwinding roller 203 and passing through the anode electrode plate cleaning mechanism 204, the anode electrode plate die-cutting mechanism 205 and the anode electrode tab connection mechanism 207 until the winding mechanism 202, and used for sensing the position of the anode electrode plate 101 on the convey path; and a plurality of anode electrode plate corrective mechanisms 220, disposed on the working platform 201, in communication connection with the central control mechanism 217, located on a convey path of the anode electrode plate 101 starting from the anode electrode plate unwinding roller 203 and passing through the anode electrode plate cleaning mechanism 204, the anode electrode plate die-cutting mechanism 205 and the anode electrode tab connection mechanism 207 until the winding mechanism 202, and used for correcting the anode electrode plate 101.

In the secondary battery winding formation system 2 according to the present invention, with reference to FIG. 1, in one embodiment, the second battery winding formation system 2 further comprises: a plurality of cathode electrode plate sensing mechanisms 221, disposed on the working platform 201, in communication connection with the central control mechanism 217, located on a convey path of the cathode electrode plate 103 starting from the cathode electrode plate unwinding roller 209 and passing through the cathode electrode plate cleaning mechanism 210, the cathode electrode plate die-cutting mechanism 211 and the cathode electrode tab connection mechanism 213 until the winding mechanism 202, and used for sensing the position of the cathode electrode plate 103 on the convey path; and a plurality of cathode electrode plate corrective mechanisms 222, disposed on the working platform 201, in communication connection with the central control mechanism 217, located on a convey path of the cathode electrode plate 103 starting from the cathode electrode plate unwinding roller 209 and passing through the cathode electrode plate cleaning mechanism 210, the cathode electrode plate die-cutting mechanism 211 and the cathode electrode tab connection mechanism 213 until the winding mechanism 202, and used for correcting the cathode electrode plate 103.

In the secondary battery winding formation system 2 according to the present invention, with reference to FIG. 1, in one embodiment, the second battery winding formation system 2 further comprises: a plurality of separator sensing mechanisms 223, disposed on the working platform 201, in communication connection with the central control mechanism 217, respectively located on a convey path of the corresponding separator 105 from the first separator unwinding roller 215A to the winding mechanism 202 and another convey path from the second separator unwinding roller 215B to the winding mechanism 202, and used for sensing the position of the corresponding separator 105 on the convey path.

In the secondary battery winding formation system 2 according to the present invention, with reference to FIG. 1, in one embodiment, the anode electrode plate unwinding roller 203, the cathode electrode plate unwinding roller 209, the first separator unwinding roller 215A and the second separator unwinding roller 215B can all extend and retract in a direction perpendicular to the working platform 201. The first separator unwinding roller 215A and the second separator unwinding roller 215B extending and retracting in a direction perpendicular to the working platform 201 may cooperate with the separator sensing mechanism 223 to realize deviation correction. Therefore, the feeding of the separator does not add an independent separator corrective mechanism.

In the secondary battery winding formation system 2 according to the present invention, with reference to FIG. 1, in one embodiment, the anode electrode plate cleaning mechanism 204 comprises: an anode electrode plate laser cleaning system 2041, for correspondingly cleaning the anode active layer 1012 of the passing anode electrode plate 101; an anode electrode plate dust removal mechanism 2042, for removing anode active layer 1012 particles generated when the anode electrode plate laser cleaning system 2041 performs cleaning; and an anode electrode plate adsorption and cooling auxiliary platform 2043, for adsorbing, fixing and cooling the anode electrode plate 101 passing through the anode electrode plate laser cleaning system 2041.

In the secondary battery winding formation system 2 according to the present invention, with reference to FIG. 1, in one embodiment, the anode electrode plate adsorption and cooling auxiliary platform 2043 can be vacuum pumping adsorption.

In the secondary battery winding formation system 2 according to the present invention, with reference to FIG. 1, in one embodiment, the cathode electrode plate cleaning mechanism 210 comprises: a cathode electrode plate laser cleaning system 2101, for correspondingly cleaning the cathode active layer 1032 of the passing cathode electrode plate 103; a cathode electrode plate dust removal mechanism 2102, for removing cathode active layer 1032 particles generated when the cathode electrode plate laser cleaning system 2101 performs cleaning; and a cathode electrode plate adsorption and cooling auxiliary platform 2103, for adsorbing, fixing and cooling the cathode electrode plate 103 passing through the cathode electrode plate laser cleaning system 2101.

In the secondary battery winding formation system 2 according to the present invention, with reference to FIG. 1, in one embodiment, the cathode electrode plate adsorption and cooling auxiliary platform 2103 can be vacuum pumping adsorption.

In the secondary battery winding formation system 2 according to the present invention, with reference to FIG. 1, in one embodiment, the anode electrode plate die-cutting mechanism 205 comprises: an anode electrode plate die-cutting male die mechanism 2051; and an anode electrode plate die-cutting female die mechanism 2052, for cooperating with the anode electrode plate die-cutting male die mechanism 2051 to, when the anode electrode plate 101 passes through the anode electrode plate die-cutting mechanism 205, die-cut, on the side edge of the anode electrode tab receiving groove 1013, the anode electrode plate 101 to form an anode electrode plate die-cut notch 1014 extending through the anode electrode plate 101; and an anode electrode plate die-cut waste collection mechanism 2053, for collecting the wastes die-cut off from the anode electrode plate 101.

In the secondary battery winding formation system 2 according to the present invention, with reference to FIG. 1, in one embodiment, the cathode electrode plate die-cutting mechanism 211 comprises: a cathode electrode plate die-cutting male die mechanism 2111; and a cathode electrode plate die-cutting female die mechanism 2112, for cooperating with the cathode electrode plate die-cutting male die mechanism 2111 to, when the cathode electrode plate 103 passes through the cathode electrode plate die-cutting mechanism 211, die-cut, on the side edge of the cathode electrode tab receiving groove 1033, the cathode electrode plate 103 to form a cathode electrode plate die-cut notch 1034 extending through the cathode electrode plate 103; and a cathode electrode plate die-cut waste collection mechanism 2113, for collecting the wastes die-cut off from the cathode electrode plate 103.

In the secondary battery winding formation system 2 according to the present invention, with reference to FIG. 1, in one embodiment, the anode electrode tab connection mechanism 207 comprises: an anode electrode tab welding head mechanism 2071; and an anode electrode tab welding base mechanism 2072, for cooperating with the anode electrode tab welding head mechanism 2071 to weld the anode electrode tab 102 to the anode current collector 1011 at the anode electrode tab receiving groove 1013.

In the secondary battery winding formation system 2 according to the present invention, with reference to FIG. 1, in one embodiment, the cathode electrode tab connection mechanism 213 comprises: a cathode electrode tab welding head mechanism 2131; and a cathode electrode tab welding base mechanism 2132, for cooperating with the cathode electrode tab welding head mechanism 2131 to weld the cathode electrode tab 104 to the cathode current collector 1031 at the cathode electrode tab receiving groove 1033.

In the secondary battery winding formation system 2 according to the present invention, with reference to FIG. 1, in one embodiment, the winding mechanism 202 comprises: a dust remover 2021, for removing the dust of the anode electrode plate 101, the cathode electrode plate 103 and the two separators 105 conveyed to the winding mechanism 202; and a winding device 2022, for stacking up the anode electrode plate 101, the cathode electrode plate 103 and the two separators 105 conveyed to the winding mechanism 202, and enabling the corresponding separator 105 to be configured between the anode electrode plate 101 and the cathode electrode plate 103 after the secondary battery is wound and formed by the winding mechanism 202.

In the secondary battery winding formation system 2 according to the present invention, with reference to FIG. 1, in one embodiment, the anode electrode plate convey mechanism 208 comprises: a fixed roller 2081, for passively enabling the anode electrode plate 101 to pass thereon; a main drive mechanism 2082, for actively driving and conveying the anode electrode plate 101; and a main drive corrective mechanism 2083, located at the upstream of the winding mechanism 202 and used for correcting the anode electrode plate 101 having entered the winding mechanism 202.

In the secondary battery winding formation system 2 according to the present invention, with reference to FIG. 1, in one embodiment, the cathode electrode plate convey mechanism 214 comprises: a fixed roller 2141, for passively enabling the cathode electrode plate 103 to pass thereon; a main drive mechanism 2142, for actively driving and conveying the cathode electrode plate 103; and a main drive corrective mechanism 2143, located at the upstream of the winding mechanism 202 and used for correcting the cathode electrode plate 103 having entered the winding mechanism 202.

In the secondary battery winding formation system 2 according to the present invention, with reference to FIG. 1, in one embodiment, the first separator convey mechanism 216A comprises a fixed roller 216A1 for passively enabling the corresponding separator 105 to pass thereon and conveying to the winding mechanism 202; and the second separator convey mechanism 216B comprises a fixed roller 216B1 for passively enabling the corresponding separator 105 to pass thereon and conveying to the winding mechanism 202.

In the secondary battery winding formation system 2 according to the present invention, with reference to FIG. 1, in one embodiment, the secondary battery winding formation system 2 further comprises: a plurality of anode electrode plate dust removal portions 224, disposed on the working platform 201, in communication connection with the central control mechanism 217, located on a convey path of the anode electrode plate 101 starting from the anode electrode plate cleaning mechanism 204 and passing through the anode electrode plate die-cutting mechanism 205 and the anode electrode tab connection mechanism 207 until the winding mechanism 202, and used for removing the anode active layer 1012 particles generated after the anode electrode plate is cleaned and the electrode tab is welded.

In the secondary battery winding formation system 2 according to the present invention, with reference to FIG. 1, in one embodiment, the secondary battery winding formation system 2 further comprises: a plurality of cathode electrode plate dust removal portions 225, disposed on the working platform 201, in communication connection with the central control mechanism 217, located on a convey path of the cathode electrode plate 103 starting from the cathode electrode plate cleaning mechanism 210 and passing through the cathode electrode plate die-cutting mechanism 211 and the cathode electrode tab connection mechanism 213 until the winding mechanism 202, and used for removing the cathode active layer 1032 particles generated after the cathode electrode plate is cleaned and the electrode tab is welded.

A comparison is performed hereafter between the performance of the secondary battery manufactured by the secondary battery winding formation system 2 of the present invention and the performance of the secondary battery manufactured by the prior art.

Embodiment 1 takes the manufacturing of the 335272 type cell (the finished battery is 3.3 mm thickness, 52 mm width, and 72 mm length) as an example. In the secondary battery 1 manufactured by the secondary battery winding formation system 2 according to the present invention, with reference to FIG. 2-5, the anode electrode plate cleaning mechanism 204 and the cathode electrode plate cleaning mechanism 210 are used to respectively clean out an anode electrode tab receiving groove 1013 and a cathode electrode tab receiving groove 1033 which are 12 mm length (in the length direction L) and 8 mm width (in the width direction W) at preset positions on the anode electrode plate 101 and the cathode electrode plate 103; the burr areas on the side edges of the anode electrode tab receiving groove 1013 and the cathode electrode tab receiving groove 1033 are die-cut by the anode electrode plate die-cutting mechanism 205 and the cathode electrode plate die-cutting mechanism 211 to form an anode electrode plate die-cut notch 1014 and a cathode electrode plate die-cut notch 1034 which are 12 mm length and 3 mm width; the long sides of the anode electrode plate die-cut notch 1014 and the cathode electrode plate die-cut notch are coincident with the corresponding long sides of the anode electrode tab receiving groove 1013 and the cathode electrode tab receiving groove 1033; the anode electrode tab 102 and the cathode electrode tab 104 which are 6 mm width are respectively welded in the anode electrode tab receiving groove 1013 and the cathode electrode tab receiving groove 1033. The first insulating adhesive tape T1 is stuck on the cathode electrode tab receiving groove 1033 having received the cathode electrode tab 104; the second insulating adhesive tape T2 is stuck on the cathode active layer 1032 at a position aligned with the anode electrode tab receiving groove 1013 after the secondary battery 1 is wound and formed; the third insulating adhesive tape T3 is stuck on the cathode active layer 1032 at a position aligned with the anode concave 1015 after the secondary battery 1 is wound and formed; the fourth insulating adhesive tape T4 is stuck on the cathode concave 1035; and the insulating adhesive tapes T1-T4 are 10 μm thickness, 15 mm length and 24 mm width. The insulating adhesive tape is not stuck on the anode electrode plate 101. The secondary battery structure according to one embodiment of the present invention is manufactured as above.

Figure 6:
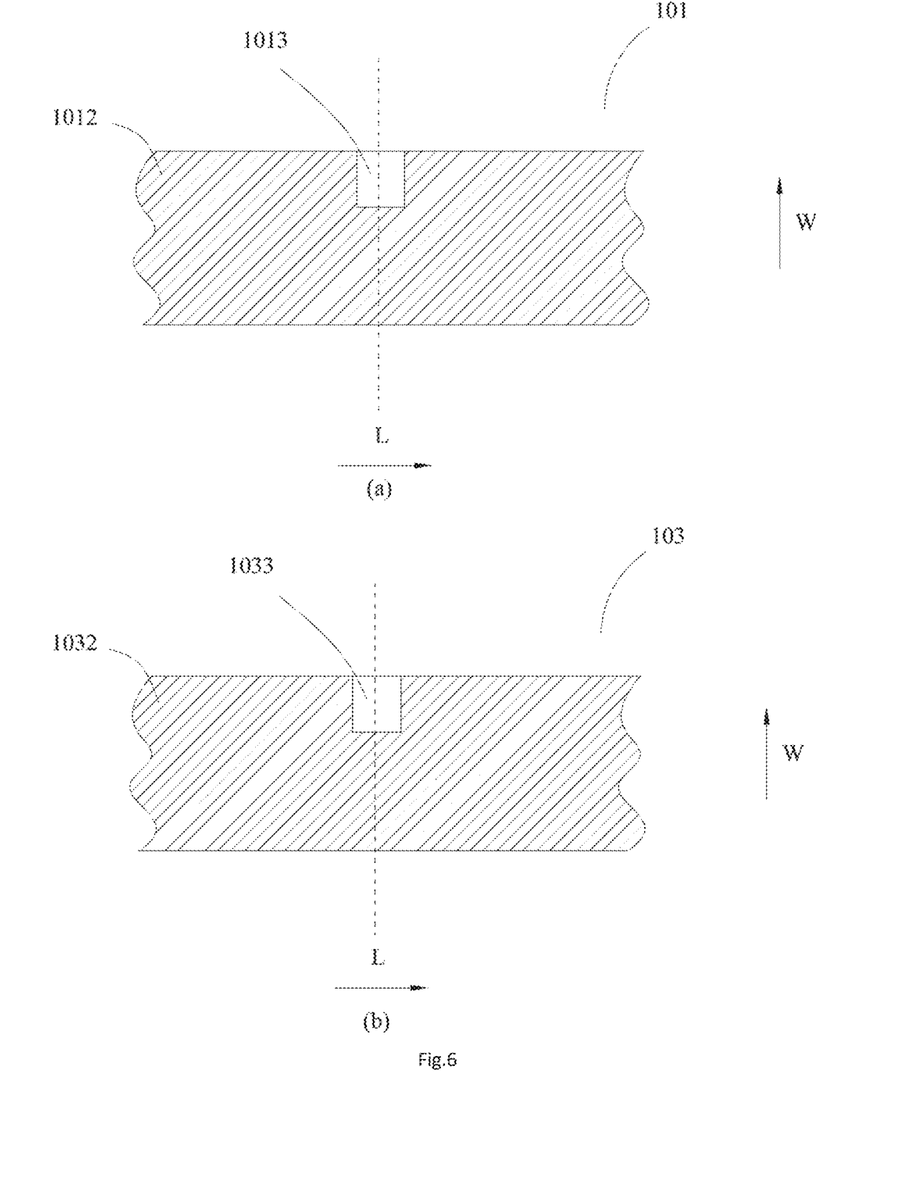
FIG. 6 is a schematic view of the electrode plates of a secondary battery in the prior art, wherein, Fig. (a) is a schematic view of the anode electrode plate, and Fig. (b) is a schematic view of the cathode electrode plate.

Comparison example 1 also takes the manufacturing of the 335272 type cell (the finished battery is 3.3 mm thickness, 52 mm width, and 72 mm length) as an example, and uses the conventional independent laser cleaning device, welding device and winding device in the prior art to manufacture a secondary battery. With reference to FIG. 6, except that the burr areas on the side edges of the anode electrode tab receiving groove 1013 and the cathode electrode tab receiving groove 1033 are not die-cut and removed and that T1-T4 adopt a 35 μm thickness insulating adhesive tape, the others are the same as the embodiment 1.

Comparison example 2 also takes the manufacturing of the 335272 type cell (the finished battery is 3.3 mm thickness, 52 mm width, and 72 mm length) as an example, wherein, except that T1-T4 adopt a 10 μm thickness insulating adhesive tape, the others are the same as the comparison example 1.

Twenty pouch cell lithium ion battery samples are respectively selected from the embodiment 1, the comparison example 1 and the comparison example 2 to perform capacity test and thickness measurement; and then the tested pouch cell lithium ion battery samples are dismantled to observe the internal short circuit situation of the cleaning grooves. The results are as shown in table 1.

TABLE 1 the test results of the embodiment 1 and the comparison examples 1-2

| | Average capacity mAh | Average volume energy density Wh/L | Average thickness mm | The number of samples generating internal short circuit |
|---|---|---|---|---|
| Embodiment 1 | 3027.5 | 937 | 3.28 | 0 |
| Comparison example 1 | 3027.3 | 925 | 3.32 | 0 |
| Comparison example 2 | 3027.4 | 937 | 3.28 | 12 |

It can be seen from the above table 1 that: in the embodiment 1, the secondary batteries manufactured by the secondary battery winding formation system 2 of the present invention ensure a high average volume energy density while none of the cells generates internal short circuit; in the comparison example 1, similarly, none of the cells generates the internal short circuit problem, however the average volume energy density is obviously reduced because a thick insulating adhesive tape is stuck; and in the comparison example 2, a high average volume energy density is ensured, however a high ratio of cells generate internal short circuit.

Therefore, in the embodiment 1, the electrode plate structure using die-cutting off the burr areas on the side edges of the anode electrode tab receiving groove 1013 and the cathode electrode tab receiving groove 1033 can completely solve the internal short circuit problem caused by the burrs, thus improving the safety use performance of the cell; furthermore, the secondary battery winding formation system 2 can reduce the comprehensive manufacturing cost of the cell.

What is claimed is:

1. A secondary battery, comprising:
a first electrode tab;
a first electrode plate, comprising:
   a first current collector; and
   a first active substance, disposed on a first surface of the first current collector and a second surface of the first current collector, wherein the second surface is opposite to the first surface;
a first electrode tab receiving groove, defined by an exposed portion of the first surface of the first current collector and the first active substance on a periphery of the first electrode tab receiving groove, the first electrode tab receiving groove receiving the first electrode tab, wherein the first electrode tab is electrically connected with the first current collector through the first electrode tab receiving groove;
a first recess that is opposite to the first electrode tab receiving groove, defined by a corresponding portion of the second surface of the first current collector and the first active substance on a periphery of the first recess;
a first electrode plate notch disposed on a side edge of the first electrode tab receiving groove and extending through the second surface and the first surface of the first current collector; and
the first electrode tab receiving groove is formed by the first current collector and at least two first active substance walls;
wherein the secondary battery is a wound-type secondary battery.

2. The secondary battery according to claim 1, further comprising:
a second electrode tab;
a second electrode plate, comprising:
   a second current collector; and
   a second active substance, disposed on a surface of the second current collector;
a second electrode tab receiving groove, configured to receive the second electrode tab, wherein the second electrode tab is electrically connected with the second current collector through the second electrode tab receiving groove; and
a second electrode plate notch disposed on a side edge of the second electrode tab receiving groove and extending through the surface of the second current collector.

3. The secondary battery according to claim 2, wherein:
the first electrode plate is an anode electrode plate;
the first current collector is an anode current collector;
the first active substance is an anode active substance;
the first electrode tab is an anode electrode tab;
the first electrode tab receiving groove is an anode electrode tab receiving groove;
the first recess is an anode recess;
the first electrode plate notch is an anode electrode plate notch;
the second electrode plate is a cathode electrode plate;
the second current collector is a cathode current collector;
the second active substance is a cathode active substance;
the second electrode tab is a cathode electrode tab;
the second electrode tab receiving groove is a cathode electrode tab receiving groove; and
the second electrode plate notch is a cathode electrode plate notch.

4. The secondary battery according to claim 3, wherein:
a length of the first electrode plate notch is 0.9-1.2 times a length of the first electrode tab receiving groove along a length direction of the first electrode plate; and
a width of the first electrode plate notch is 0.2-0.8 times a width of the first electrode tab receiving groove along a width direction of the first electrode plate.

5. The secondary battery according to claim 3, further comprising:
a first insulating adhesive tape, disposed on the second electrode tab receiving groove; and
a second insulating adhesive tape, disposed on the second active substance and facing the first electrode tab receiving groove.

6. The secondary battery according to claim 5, further comprising:
a third insulating adhesive tape, disposed on the anode recess.

7. The secondary battery according to claim 5, further comprising:
a fourth insulating adhesive tape;
the cathode electrode plate comprising a cathode recess, wherein the cathode recess and the cathode electrode tab receiving groove are disposed on opposite sides of the cathode current collector; and
the fourth insulating adhesive tape is disposed on the cathode recess.

8. The secondary battery according to claim 7, wherein:
each of the first insulating adhesive tape, the second insulating adhesive tape, the third insulating adhesive tape, and the fourth insulating adhesive tape is a single-sided insulating adhesive tape.

9. The secondary battery according to claim 1, wherein:
the first electrode tab receiving groove is defined by the first active substance and extends to the first surface of the first current collector; and
the first electrode plate notch extends through the first current collector from the first surface of the first current collector.

10. The secondary battery according to claim 2, wherein:
the second electrode tab receiving groove is defined in the second active substance and extends to the surface of the second current collector; and
the second electrode plate notch extends through the second current collector from the surface of the second current collector.

11. The secondary battery according to claim 1, wherein a whole of the first electrode tab is parallel with the first surface of the first current collector.

12. The secondary battery according to claim 1, wherein a bottom of the first electrode plate notch is located between the first active substance disposed on two opposite sides of the first electrode tab receiving groove in the length direction of the first electrode plate.

* * * * *